(12) United States Patent
De Bruijn et al.

(10) Patent No.: US 9,130,674 B2
(45) Date of Patent: Sep. 8, 2015

(54) CODED-LIGHT DETECTION SYSTEM INCLUDING A CAMERA, LIGHT SENSOR AND AUGMENTED INFORMATION DISPLAY

(75) Inventors: Frederik Jan De Bruijn, Eindhoven (NL); Arnoldus Antonius de Beijer, Eindhoven (NL); Lorenzo Feri, Eindhoven (NL); Chris Damkat, Eindhoven (NL); Remco Theodorus Johannes Muijs, Meteren (NL); Jelte Peter Vink, Waalre (NL)

(73) Assignee: Koninklijke Philips N.V., Eindhoven (NL)

( * ) Notice: Subject to any disclaimer, the term of this patent is extended or adjusted under 35 U.S.C. 154(b) by 94 days.

(21) Appl. No.: 14/124,746

(22) PCT Filed: May 28, 2012

(86) PCT No.: PCT/IB2012/052655
§ 371 (c)(1),
(2), (4) Date: Dec. 9, 2013

(87) PCT Pub. No.: WO2012/168823
PCT Pub. Date: Dec. 13, 2012

(65) Prior Publication Data
US 2014/0103194 A1    Apr. 17, 2014

(30) Foreign Application Priority Data
Jun. 10, 2011 (EP) .................................. 11169387

(51) Int. Cl.
*H01J 40/14* (2006.01)
*H04B 10/11* (2013.01)
(Continued)

(52) U.S. Cl.
CPC .............. *H04B 10/11* (2013.01); *H04B 10/116* (2013.01); *H04B 10/1121* (2013.01)

(58) Field of Classification Search
USPC ....................................................... 250/578.1
See application file for complete search history.

(56) References Cited

U.S. PATENT DOCUMENTS

2002/0071185 A1* 6/2002 Chretien et al. .............. 359/629
2010/0295457 A1   11/2010 Lu et al.

FOREIGN PATENT DOCUMENTS

| WO | 2010079400 A1 | 7/2010 |
| WO | 2010146519 A1 | 12/2010 |
| WO | 2011051865 A1 | 5/2011 |

OTHER PUBLICATIONS

Peter Lee et al; "Single-Sensor System for Spatially Resolved, Continuous, and Multiparametric Optical Mapping of Cardiac Tissue", Heart Rhythm, Elsevier, US, vol. 8, No. 9, Mar. 28, 2011, XP028272682, pp. 1482-1491.
(Continued)

*Primary Examiner* — Thanh Luu
(74) *Attorney, Agent, or Firm* — Meenakshy Chakravorty

(57) ABSTRACT

There is disclosed a sensing device (100) adapted to receive light emitted from a plurality of light sources (A, B), each of the plurality of light sources (A, B) emitting light comprising a light source identifier. The sensing device (100) comprises a sensing module (110) comprising a light selection unit (114) configured to receive at least a portion of the light emitted from the plurality of light sources (A, B) and a light selection unit (114) configured to receive at least a portion of the light emitted from the plurality of light sources (A, B). The light selection unit (114) is adapted to selectively convey a selected portion of light received by the light selection unit (114) to a second photo sensor unit (116). The light selection unit (114) is arranged relatively to the first photo sensor unit (112), or vice versa, in such a way that the selected portion of light is associated with a photo sensor of a plurality of photo sensors of the first photo sensor unit (114) detecting light.

19 Claims, 3 Drawing Sheets

(51) Int. Cl.
  *H04B 10/116* (2013.01)
  *H04B 10/112* (2013.01)

(56) References Cited

OTHER PUBLICATIONS

Quyen Bui et al; A Comparison of Using Probabilistic Motion Models for Mobile Robot Pose Estimation, ICCAS-SICE, IEEE, Piscataway, NJ, USA, Aug. 18, 2009, pp. 528-532, XP031565194.

N. Abramson; "The Alohanet—Surfing for Wireless Data", IEEE Communications Magazine, Dec. 2009, pp. 21-25.
N.Abramson; "The Aloha System—Another Alternative for Computer Communications", Proc. Fall Joint Computer Conf. AFIPS Press, pp. 281-285, 1970.
H. Durrant-Whyte et al; "Simultaneous Localization and Mapping (SLAM); Part 1 the Essential Algorithms", Robotics and Automation Magazine, Jun. 2006, pp. 1-9.
A.J. Davison et al; "Monoslam: Real-Time Single Camera Slam", IEEE Transactions on Pattern Analysis and Machine Intelligence (PAMI), vol. 26, pp. 1052-1076, 2007.

\* cited by examiner

CODED-LIGHT DETECTION SYSTEM INCLUDING A CAMERA, LIGHT SENSOR AND AUGMENTED INFORMATION DISPLAY

FIELD OF THE INVENTION

The present invention generally relates to the field of illumination systems comprising a plurality of light sources, each light source emitting light into which information is coded, and the field of light detection. More specifically, the present invention relates to a sensing device for detecting information encoded into the light output of such illumination systems.

BACKGROUND OF THE INVENTION

Light into which information is encoded enables humanly imperceptible transmission of data or information using otherwise visible light emitted by a light source of an illumination system. Particularly in the context of installation and maintenance of such illumination systems, the data or information may comprise a light source identifier, but also light source status information such as temperature, accumulated operating hours, etc.

One technique that has been proposed to provide transmission of such data or information is based on embedding codes, or 'identifiers', identifying a light source or a group of light sources by modulating the light output thereof in a manner so that the embedded codes are invisible to the users. Such light output is sometimes referred to as 'coded light'.

Detection of the data or information typically takes place by using a photodiode as a light sensor. In a situation where light originating from several light sources is detected by the photodiode, the possibility to separate the data transmissions of the respective light sources depends on the chosen transmission protocol. The transmission protocol is essentially a network protocol that functions in a similar way as in a data network. For practical reasons, the communication typically takes place in an asynchronous fashion, by transmitting data in separate short binary sequences called packets. To enable detection of several light sources using a single photodiode the so-called ALOHA protocol is used (see N. Abrahamson, "The ALOHA system—Another alternative for computer communications", in Proc. Fall Joint Computer Conference, AFIPS Press, pp. 281-285 [1970]). According to the ALOHA protocol, each repeated packet transmission takes place after a random time interval. As a result, the total average transmission time per packet is equal to the sum of the packet duration and the average random time interval. In case there are additional light sources in the field of view of the photodiode, simultaneously transmitted packets collide and are therefore lost.

It has been demonstrated that the average transmission time required for successful reception of all light sources in the field of view of the photodiode increases exponentially with the number of light sources present within the field of view of the photodiode. For detection of data encoded into light from several light sources, in case rapid detection of the data is not required, the exponential increase of the required average transmission time, i.e. the required time for performing the detection of data from all light sources, may not constitute a problem. However, there are situations in which a protocol-based approach for detection of data encoded into light from several light sources may not be appropriate. One of such situations is when the available time for performing the detection is limited, for instance, in the case of detection of light emitted from several light sources from a position in a moving vehicle. Another one of such situations is where there is a relatively large number of light sources transmitting information. Such a situation can for example occur when the detection takes place from a position that is far away from the light sources, e.g., detection of light sources on the ground from a position in a helicopter in the air. A photodiode used for detecting light originating from several light sources has a limited directional resolution. Thus, in the latter situation where the distance between the light sources and the photodiode is large, it will become difficult to aim the photodiode at individual light sources.

SUMMARY OF THE INVENTION

In view of the above discussion, a concern of the present invention is to facilitate or even enable identification and/or detection of data of a relatively large number of light sources emitting coded light.

Another concern of the present invention is to mitigate or even eliminate problems in identification and/or detection of data of a relatively large number of light sources emitting coded light related to the limited directional resolution of a photo detector such as a photodiode.

To address one or more of these concerns and other concerns, a sensing device in accordance with the independent claim is provided. Preferred embodiments are defined by the dependent claims.

According to a first aspect of the present invention, there is provided a sensing device adapted to receive light emitted from a plurality of light sources, eat least some of the plurality of light sources emitting light comprising a light source identifier. The sensing device comprises a sensing module and a processing module connectable to the sensing module.

The sensing module comprises a first photo sensor unit configured to receive at least a portion of the light emitted from the plurality of light sources. The first photo sensor unit comprises a plurality of photo sensors, the plurality of photo sensors being adapted to detect light impinging on the respective photo sensor.

The sensing module comprises a light selection unit configured to receive at least a portion of the light emitted from the plurality of light sources.

The sensing module comprises a second photo sensor unit adapted to generate a signal corresponding to light impinging thereon.

The light selection unit is adapted to selectively convey a selected portion of light received by the light selection unit to the second photo sensor unit.

The light selection unit is arranged relatively to the first photo sensor unit, or vice versa, in such a way that the selected portion of light is associated with a photo sensor of the plurality of photo sensors of the first photo sensor unit detecting light.

The processing module is configured to determine a light source identifier of the selected portion of light for identifying a light source from which the selected portion of light originates. The identification is performed on basis of a signal generated by the second photo sensor unit.

The first photo sensor unit may for example comprise an array of photo sensors such as an image sensor, e.g. a spatially pixelated image sensor.

The gist of the present invention is to provide means for steering an optical element to selectively receive and/or detect light originating from individual light sources of a plurality of light sources emitting light comprising a light source identifier, e.g., a plurality of light sources emitting coded light. This is carried out by one or more of suppressing, inhibiting, redirecting, absorbing, etc., light emitted from substantially all or all of the plurality of light sources except a selected one of the plurality of light sources. Light emitted by the selected light source is allowed to impinge on or enter a photo sensor capable of decoding information or data coded into light received by the photo sensor. Light emitted from the plurality of light sources can be detected by a photo sensor unit comprising a plurality of photo sensors such as an image sensor. In this way, information can be provided to a user and/or a control device, on basis of which information the selection of the light source, the light of which is allowed to impinge on or enter the photo sensor, can be facilitated or even enabled.

By means of the light selection unit, a selected portion of light received by the light selection unit can be conveyed to the second photo sensor unit. This facilitates or even enables suppression of the remaining light received by the light selection unit, such that the second photo sensor unit at least momentarily may receive light originating from one of the plurality of light sources only or from a relatively small number of light sources of the plurality of light sources only. By a relatively small number of light sources it is in this context meant a number of light sources that is small compared to the total number of light sources of the plurality of light sources. In other words, the light received by the light sensing device can be adapted by means of the light selection unit such that the second photo sensor unit in principle is presented with light originating from one of the plurality of light sources at a time, which may allow for relatively accurate and/or quick establishment of the identities of the respective light sources. This is due to that by the arrangement of the light selection unit in the sensing device it may be partially or even completely avoided that the second photo sensor unit is presented with light originating from a relatively large number of coded light sources at the same time.

By a sensing device according to the present invention, the time required for selective detection of a plurality of light sources in the field of view of the sensing device, each light source emitting coded light, may increase linearly or substantially linearly with the number of light sources in the plurality of light sources. This may hold even in the situation where all or substantially all of the light sources are emitting coded light in accordance with an ALOHA protocol. The selective detection may e.g. comprise establishing the identities of the respective light sources. Thus, a sensing device according to the present invention may allow for a quicker selective detection of a plurality of light sources in the field of view of the sensing device compared to an ALOHA protocol-based approach for detection of data encoded into light from several light sources. This may particularly be the case in a situation where the number of light sources present within the field of view is relatively large.

By means of the light selection unit, selective detection of a plurality of light sources in the field of view of the sensing device, each light source emitting coded light, may be facilitated or even enabled in a situation where the field of view of the sensing device includes a relatively large number of light sources where the distance between adjacent light sources as seen from the sensing device is relatively small, i.e. where the 'density' of light sources in a two-dimensional plane as seen from the sensing device is relatively large. Such a situation may arise when the detection takes place from a position that is far away from the light sources, e.g., detection of light sources on the ground from a position in a helicopter in the air.

The plurality of light sources may be adapted to emit light comprising a light source identifier by encoding the light source identifier into the light for example by modulating the emitted light in such a way that the light source identifier subsequently can be decoded once received at a receiver and/or sensor.

Alternatively, the light selection unit may be arranged relatively to the first photo sensor unit in such a way that the selected portion of light is associated with a subset of photo sensors of the set of photo sensors comprising the plurality of photo sensors of the first photo sensor unit detecting light. According to one example, the arrangement may be such that the selected portion of light is associated with a proper subset of photo sensors of the set of photo sensors comprising the plurality of photo sensors of the first photo sensor unit detecting light. In the context of the present application, by a proper subset of a set it is meant a set that is a subset of the set but not equal to it.

Hence, the light selection unit may be arranged so as to enable isolating the light output of a single light source from a plurality of light sources emitting coded light for selective conveyance to the second photo sensor unit.

Alternatively, the light selection unit may be arranged so as to enable isolating light output of a few light sources from a plurality of light sources emitting coded light for selective conveyance to the second photo sensor unit.

The second photo sensor unit may be segmented, i.e. it may comprise a plurality of photosensitive areas, so as to enable detecting light from the few light sources, possibly substantially simultaneously or even simultaneously, by means of the arrangement of the light selection unit relatively to the first photo sensor unit, or vice versa. Each of the photosensitive areas or segments of the second photo sensor unit may be associated with a corresponding subset or proper subset of the plurality of photo sensors of the first photo sensor unit. Such a configuration may be utilized for tracking and detection of several light sources emitting coded light substantially at the same time.

As described in the foregoing, the sensing module comprises a light selection unit configured to receive at least a portion of the emitted light, and a first photo sensor unit configured to receive at least a portion of the emitted light. To this end, the sensing module and/or another part of the sensing device may for example comprise a beam splitter, configured to receive light emitted from the plurality of light sources and convey a portion of the received light to the first photo sensor unit and convey a portion of the received light to the light selection unit. For example, the beam splitter may be adapted to convey a first portion of the received light to the first photo sensor unit and a second portion of the received light to the light selection unit.

As mentioned above, the light selection unit is adapted to selectively convey a selected portion of light received by the light selection unit to the second photo sensor unit. In other words, the light selection unit may be adapted to cause the selected portion of light to pass from the light selection unit to the second photo sensor unit, or by itself pass the selected portion of light from the light selection unit to the second photo sensor unit.

According to one example, only the selected portion of light is transmitted or conveyed from the light selection unit to the second photo sensor unit. The remainder of the light received by the light selection unit is blocked from transmission or conveyance to the second photo sensor unit, e.g., by the remainder of the light being one or more of suppressed, inhibited, reflected, absorbed, redirected, etc., at the light selection unit.

In the context of the present application, a light source emitting light comprising a light source identifier may mean a light source emitting light into which a light source identifier is encoded, for example by the emitted light being modulated in a manner so as to enable decoding of the emitted light received by a sensing device or a receiver thereat.

The second photo sensor unit may be optically coupled to the light selection unit.

The plurality of photo sensors of the first photo sensor unit or the first photo sensor unit may for example comprise or be constituted by a charge-coupled device (CCD) based image sensor and/or a complementary metal-oxide-semiconductor oxide (CMOS) image sensor.

The second photo sensor unit may for example comprise or be constituted by a photodiode, phototransistor, bolometer or another type of photoelectric converter.

The light selection unit may be arranged relatively to the first photo sensor unit in such a way that the selected portion of light is associated with a photo sensor of the plurality of photo sensors of the first photo sensor unit detecting light, such that the selected portion of light corresponds to light impinging on the above-mentioned photo sensor of the plurality of photo sensors of the first photo sensor unit detecting light. By means of such a correspondence between the selected portion of light and one of the photo sensors of the first photo sensor unit and determination of light identifier of the selected portion of light, the identity and/or other data of the light source, the light emitted by which impinges on the above-mentioned photo sensor of the plurality of photo sensors of the first photo sensor unit, can be associated with indication of location of that light source in the field of view of the sensing device provided by the first photo sensor unit.

The light selection unit may be configured to selectively and controllably convey the selected portion of the light to the second photo sensor unit.

The sensing device may comprise a control module configured to select a photo sensor of the plurality of photo sensors of the first photo sensor unit detecting light, and, on basis of the arrangement of the light selection unit relatively to the first photo sensor unit, control the light selection unit to convey a selected portion of the light to the second photo sensor such that the selected portion of light is associated with the selected photo sensor of the plurality of photo sensors of the first photo sensor unit.

Selection of light emitted from one light source within the field of view of the sensing device, by means of selection of a photo sensor detecting light of those of the plurality of photo sensors of the first photo sensor unit that are detecting light performed by the control module, may be performed manually by a user, for example using a user interface (UI) of the control module displayed on a display unit. Alternatively or optionally, this may be performed automatically, for example by means of an algorithm implemented in the control module for selecting all of the light sources visible in the field of view of the sensing device as determined by means of the first photo sensor unit one by one.

The light selection unit may comprise a plurality of light selecting elements, each light selecting element being configured to controllably and selectively convey light impinging on the light selecting element to the second photo sensor unit.

The light selection unit may be arranged relatively to the first photo sensor unit in such a way that there is a correspondence between the plurality of light selecting elements and the plurality of photo sensors of the first photo sensor unit. For example, there may be a one-to-one correspondence between the plurality of light selecting elements and the plurality of photo sensors of the first photo sensor unit.

For example, the plurality of light selecting elements may comprise a plurality of liquid crystal display (LCD) elements controllable with regards to light attenuation. Each of the plurality of LCD elements may be configured to controllably and selectively convey light impinging on the LCD element to the second photo sensor unit. The selective and controllable conveyance of light by each LCD element may be carried out by varying the light attenuation of the respective LCD element appropriately.

According to one example the plurality of LCD elements is comparable to an LCD matrix. A movable aperture in the light selection unit may be created by momentarily and reversibly opening one or a few pixels of the LCD matrix.

According to another example the light selection unit comprises a microelectromechanical system (MEMS) device configured to controllably and selectively convey light impinging on the MEMS device to the second photo sensor unit.

The MEMS device may comprise a plurality of micromirrors, where each micromirror is configured to controllably and selectively convey light impinging on the micromirror to the second photo sensor unit.

The processing module may be configured to determine a light source identifier of the selected portion of light for identifying a light source from which the selected portion of light originates on basis of a signal generated by the second photo sensor unit and a switching frequency of a micromirror, based on heterodyne detection. Alternatively or optionally, location, configuration and/or status information related to the respective light source can be determined by the processing module. Such information may be encoded into the light emitted by the plurality of light sources.

The heterodyne detection may comprise nonlinearly mixing the frequency of the signal generated by the second photo sensor unit and the switching frequency of the micromirror. From a resulting difference frequency information of the signal generated by the second photo sensor unit such as frequency modulation can be determined.

The light selection unit and the second photo sensor unit may be constituted by an active pixel image sensor comprising a plurality of pixels. The active pixel image sensor is configured to select a portion of the received light by selecting a least one pixel of the active pixel image sensor as active region and generate a signal corresponding to the selected portion of light. The active pixel image sensor may be arranged relatively to the first photo sensor unit in such a way that the selected portion of light is associated with the photo sensor of the plurality of photo sensors of the first photo sensor unit detecting light.

The first photo sensor unit, the light selection unit and the second photo sensor unit may be constituted by an active pixel image sensor comprising a plurality of pixels. The active pixel image sensor is configured to select a portion of the received light by selecting a least one pixel of the active pixel image sensor that is detecting light as active region and generate a signal corresponding to the selected portion of light. Hence the respective functions of all of the first photo sensor unit, the light selection unit and the second photo sensor unit may be performed by the same device, namely the active pixel image sensor having a selectable active region.

The active pixel image sensor may for example comprise a CMOS based active pixel image sensor, a CCD based active pixel image sensor and/or another type of active pixel image sensor.

Selection of at least one pixel of e.g. a CMOS active pixel image sensor, or reduction or cropping of the image sensitive region of a CMOS image sensor, is a feature of some CMOS image sensors, and allows the frame rate to be increased compared to full-frame image capture, i.e. where the active region comprises all of the pixels of the CMOS image sensor.

The increased frame rate may reach up to frame rates on the order of 1000 frames per second, possibly combined with pixel binning.

In the context of the present application, by pixel binning it is meant combination of information derived from adjacent pixels in the image sensor. Pixel binning of 1×1 means that an individual pixel in the image sensor is used as is. A pixel binning of 2×2 means that a region of four adjacent pixels in the image sensor has been combined into one larger pixel, and so on.

The light selection unit may comprise a light-transmissive portion configured to convey the selected portion of light to the second photo sensor unit. Hence, the light selection unit is not necessarily controllable with regards to conveyance of the selected portion of the light to the second photo sensor unit such as has been described above.

The light-transmissive portion may for example comprise an aperture arranged in the light selection unit.

The light selection unit may be arranged relatively to the first photo sensor unit in such a way that the light-transmissive portion is associated with at least one of the plurality of photo sensors of the first photo sensor unit. For example in the case where the first photo sensor unit comprises an image sensor, a predefined portion of a display displayed on a display unit of at least one image captured by the image sensor and may be associated with the light-transmissive portion of the light-selection unit. By such a configuration, the user may select a particular light source visible in the field of view of the sensing device by adjusting the position and/or orientation of the sensing device relatively to the plurality of light sources while the image on the display is updated by the image sensor capturing images so as to momentarily maintain the particular light source in the predefined portion of the display. Thereby, only light emitted from the particular light source is allowed to be conveyed to the second photo sensor unit via the light selection unit. The predefined portion of the display may for example comprise a portion of the display situated in the centre of the display.

As indicated in the foregoing, by means of the light selection unit being configured to selectively and controllably convey the selected portion of the light to the second photo sensor unit according to embodiments of the present invention, it may be achieved that only light emitted from a particular light source of the plurality of light sources is allowed to be conveyed to the second photo sensor unit via the light selection unit. As also indicated in the foregoing, the same or a similar effect may be achieved by means of the light selection unit comprising a light-transmissive portion configured to convey the selected portion of light to the second photo sensor unit according to embodiments of the present invention. Thus, the feature of the light selection unit being configured to selectively and controllably convey the selected portion of the light to the second photo sensor unit and the feature of the light selection unit comprising a light-transmissive portion configured to convey the selected portion of light to the second photo sensor unit represent corresponding technical features in that they may provide the same or similar technical effect.

As indicated above, the first photo sensor unit may comprise an image sensor.

The image sensor may for example comprise a CMOS based image sensor, e.g., a CMOS active pixel image sensor, and/or a CCD image sensor.

The image sensor may for example be comprised in a camera device. According to one example the image sensor, or camera device, and the second photo sensor unit are coupled such that the field of view of the second photo sensor unit is associated with an area in the proximity of the center of the image sensor or camera frame.

The image sensor and/or camera device may for example be comprised in a wireless transmit/receive unit such as a so called smart phone. The second photo sensor unit may be connectable to the wireless transmit/receive unit.

Each of the plurality of light sources may be emitting light comprising location, configuration and/or status information related to the respective light source. Such information may be encoded into the light for example by modulating the emitted light in such a way that the information subsequently can be decoded once received at a receiver and/or sensor. Hence, the processing module may be configured to extract information related to the identified light source from the signal generated by the second photo sensor unit.

Configuration information of a light source may for example comprise luminance, color, operating power, operating temperature, operating temperature relatively to a threshold temperature, etc., of the light source.

Status information of a light source may for example comprise accumulated operating or burning hours, estimated lifetime remaining, etc., of the light source.

The image sensor may be adapted to capture at least one image and produce an image representation of each captured image.

The information related to the identified light source extracted by the processing module may be included in the image representation. Hence, captured images of the field of view of the sensing device may be augmented with light source related information such as described above for subsequent display to the user. The light source related information may for example be overlaid on captured images for providing a user with real-time information of light source related information. Such functionality may be particularly useful during installation and/or commissioning of lighting systems comprising a plurality of light sources, each of the plurality of light sources emitting coded light.

To this end, the sensing device may comprise a combiner and/or multiplexer connectable to the processing module and the sensing module, respectively. The combiner may be configured to include the information related to the identified light source in the image representation.

The image sensor may be adapted to capture a plurality of images and produce an image representation of each captured image.

The sensing device may comprise an image processing module connectable to the sensing module.

The image processing module may be connectable to the combiner and/or multiplexer. The image processing module may be configured to determine orientation and/or position of the sensing module and/or the image sensor with respect to the plurality of light sources on basis of the image representations corresponding to the captured images.

Hence, so called augmented reality (AR) may be provided. By means of providing position and/or orientation of, e.g., the image sensor, light source related information, both currently generated information and previously generated information, may be presented to a user. The light source related information may comprise light source related information comprising location, configuration and/or status information related to the respective light sources. The light source related information may for example be overlaid or superimposed on captured images for providing a user with real-time information of light source related information while providing a display of the field of view of the sensing device.

Continuous estimation of position and/or orientation of, e.g., the image sensor such as described above may be carried out in accordance with simultaneous localization and mapping (SLAM) as disclosed in, e.g., A. J. Davison et al., "MonoSLAM: Real-time single camera SLAM", IEEE Transactions on Pattern Analysis and Machine Intelligence (PAMI), vol. 26, p. 1052-1076 (2007), and H. Durrant-Whyte et al., "Simultaneous localization and mapping (SLAM): Part I The essential algorithms", Robotics and Automation Magazine, June 2006.

According to a second aspect of the present invention, there is provided a sensing module included in a sensing device according to the present invention.

According to a third aspect of the present invention, there is provided a lighting system comprising a plurality of light sources, at least some of the plurality of light sources emitting light comprising a light source identifier, a sensing device according to the present invention, the sensing device being adapted to receive light emitted from the plurality of light sources.

Further objects and advantages of the present invention are described in the following by means of exemplifying embodiments.

It is noted that the present invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

Exemplifying embodiments of the invention will be described below with reference to the accompanying drawings, in which.

In the accompanying drawings, the same reference numerals denote the same or similar elements throughout the views.

DETAILED DESCRIPTION

The present invention will now be described more fully hereinafter with reference to the accompanying drawings, in which exemplifying embodiments of the present invention are shown. This present invention may, however, be embodied in many different forms and should not be construed as limited to the embodiments set forth herein; rather, these embodiments are provided by way of example so that this disclosure will convey the scope of the invention to those skilled in the art. Furthermore, like numbers refer to like or similar elements or components throughout.

Figure 1A:
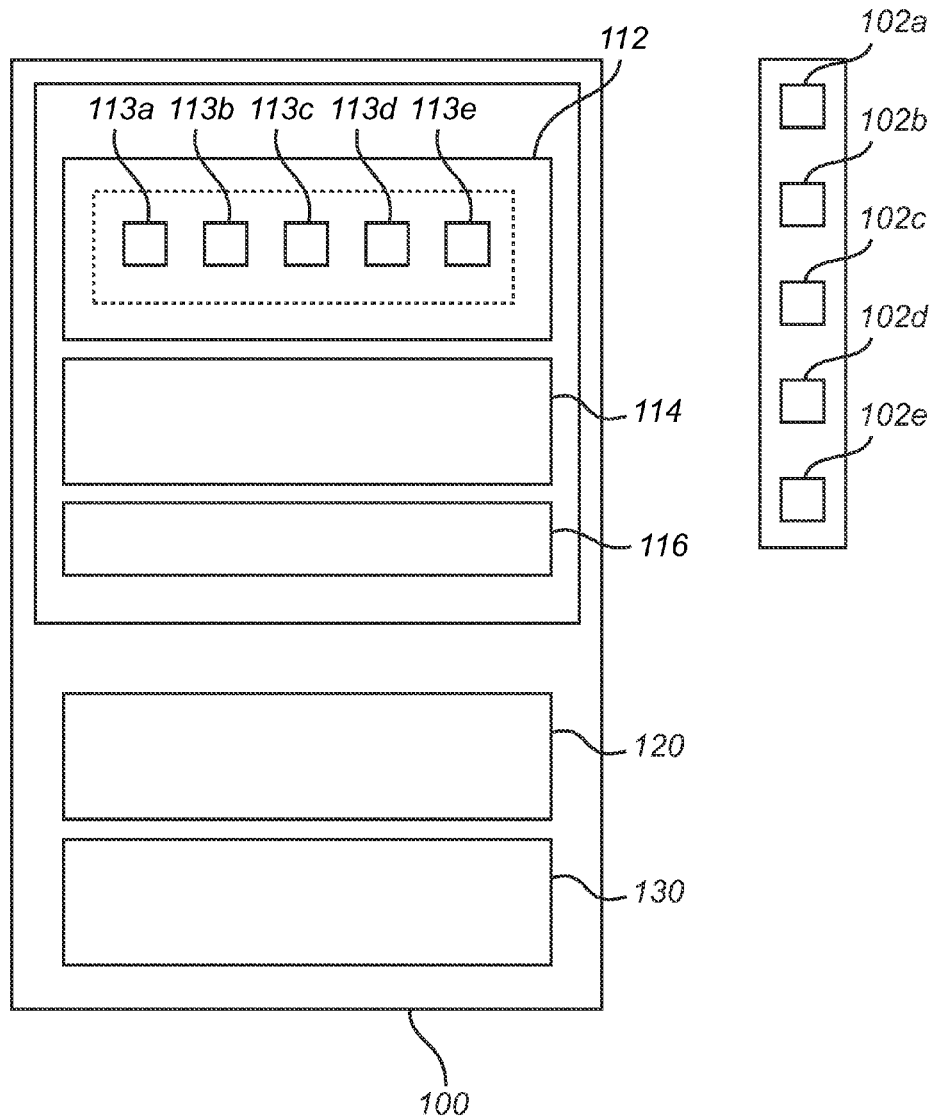
FIG. 1a is a schematic block diagram of a sensing device according to an exemplifying embodiment of the present invention.

Referring now to FIG. 1a, there is shown a schematic block diagram of a sensing device 100 according to an exemplifying embodiment of the present invention.

The sensing device 100 is adapted to receive light emitted from a plurality 102 of light sources 102a-102e, each of the plurality 102 of light sources 102a-102e emitting light comprising a light source identifier.

In FIG. 1a there is shown five light sources 102a-102e. The number of light sources comprised in the plurality 102 of light sources 102a-102e depicted in FIG. 1a is according to an example. It is to be understood that the plurality of light sources may comprise any number of light sources being a positive integer, such as one, two, three, four, six, ten, fifteen, twenty, thirty or fifty or more light sources.

The sensing device 100 comprises a sensing module 110 and a processing module 120 connectable to the sensing module 110.

The sensing module 110 comprises a first photo sensor unit 112 configured to receive at least a portion of the emitted light. The first photo sensor unit 112 comprises a plurality of photo sensors 113a-113e, each of the plurality of photo sensors 113a-113e being adapted to detect light impinging on the respective photo sensor 113a-113e.

In FIG. 1a there are shown five photo sensors 113a-113e comprised in the first photo sensor unit 112. The number of photo sensors in the plurality of photo sensors 113a-113e depicted in FIG. 1a is according to an example. It is to be understood that the plurality of photo sensors comprised in the first photo sensor unit 112 may comprise any number of photo sensors being a positive integer, such as one, two, three, four, six, ten, fifteen, twenty, or hundred or more photo sensors.

The sensing module 110 comprises a light selection unit 114 configured to receive at least a portion of the emitted light.

The sensing module 110 comprises a second photo sensor unit 116 adapted to generate a signal corresponding to light impinging thereon.

The light selection unit 114 is adapted to selectively convey a selected portion of light received by the light selection unit 114 to the second photo sensor unit 116.

The light selection unit 114 is arranged relatively to the first photo sensor unit 112 in such a way that the selected portion of light is associated with a photo sensor 113a-113e of the plurality of photo sensors 113a-113e of the first photo sensor unit 112 detecting light.

The processing module 120 is configured to determine a light source identifier of the selected portion of light for identifying a light source 102a-102e from which the selected portion of light originates. The identification is performed on basis of a signal generated by the second photo sensor unit 116.

The sensing device 100 comprises a control module 130 configured to select a photo sensor 113a-113e of the plurality of photo sensors 113a-113e of the first photo sensor unit 112 detecting light. On basis of the arrangement of the light selection unit 114 relatively to the first photo sensor unit 112, the control module 130 is adapted to control the light selection unit 114 to convey a selected portion of the light to the second photo sensor 116 such that the selected portion of light is associated with the selected photo sensor 113a-113e of the plurality of photo sensors 113a-113e of the first photo sensor unit 112.

Hence, the light selection unit 114 is configured to selectively and controllably convey the selected portion of the light to the second photo sensor unit 116. However, the light selection unit 114 is not necessarily controllable with regards to conveyance of the selected portion of the light to the second photo sensor unit 116. This has been described in more detail in the foregoing and further in the following with reference to FIG. 1d.

Figure 1B:
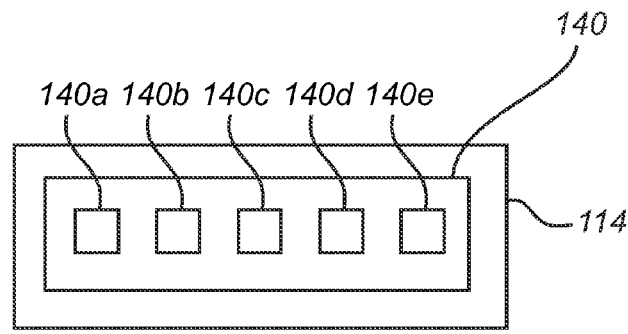
FIG. 1b-1d are schematic block diagrams of light selecting units in accordance with exemplifying embodiments of the present invention.

Referring now to FIG. 1b, there is shown a schematic block diagram of a light selecting unit 114 in accordance with an exemplifying embodiment of the present invention.

The light selecting unit 114 comprises a plurality 140 of light-selecting elements 140a-140e. Each light selecting element 140a-140e is configured to controllably and selectively convey light impinging on the respective light-selecting element 140a-140e to the second photo sensor unit 116. Hence, each light-selecting element 140a-140e is controllable with regards to conveyance of light to the second photo sensor unit 116 independently of the other light-selecting elements 140a-140e.

The number of light-selecting elements 140a-140e depicted in FIG. 1b is according to an example. In principle the number of light-selecting elements can be any positive integer, such as six, ten, twenty or hundred or more.

Figure 1C:
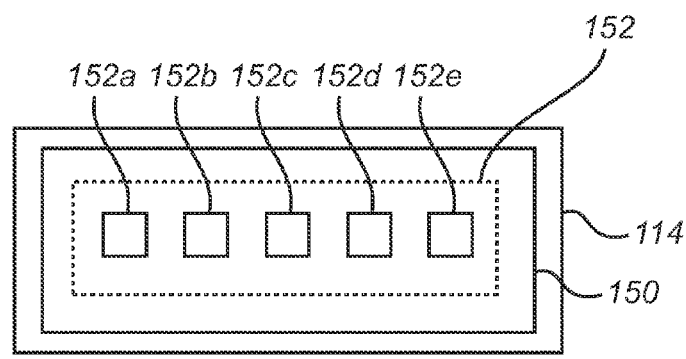

Referring now to FIG. 1c, there is shown a schematic block diagram of a light selecting unit 114 in accordance with an exemplifying embodiment of the present invention.

The light selection unit 114 comprises a microelectromechanical system (MEMS) device 150 configured to controllably and selectively convey light impinging on the MEMS device to the second photo sensor unit 116. To this end, the MEMS device 150 comprises a plurality 152 of micromirrors 152a-152e. Each micromirror 152a-152e is configured to controllably and selectively convey light impinging on the respective micromirror 152a-152e to the second photo sensor unit 116. Hence, each micromirror 152a-152e is controllable with regards to conveyance of light to the second photo sensor unit 116 independently of the other micromirrors 152a-152e.

The number of micromirrors 152a-152e depicted in FIG. 1c is according to an example. In principle the number of micromirrors can be any positive integer, such as six, ten, twenty or thirty or more.

Figures 1D, 1E:
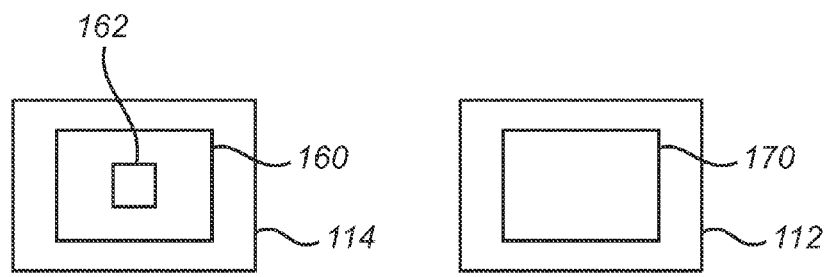
FIG. 1e is a schematic block diagram of a first photo sensor unit in accordance with an exemplifying embodiment of the present invention.

Referring now to FIG. 1d, there is shown a schematic block diagram of a light selecting unit 114 in accordance with an exemplifying embodiment of the present invention.

The light selection unit 114 comprises a light-transmissive portion 160 configured to convey the selected portion of light to the second photo sensor unit 116. According to the depicted example, the light-transmissive portion 160 comprises an aperture 162 arranged in the light selection unit 114.

Referring now to FIG. 1e, there is shown a schematic block diagram of a first photo sensor unit 112 in accordance with an exemplifying embodiment of the present invention.

The first photo sensor unit 112 comprises an image sensor 170. The image sensor 170 may for example comprise or be constituted by a CCD based image sensor and/or a CMOS based image sensor.

Figure 2:
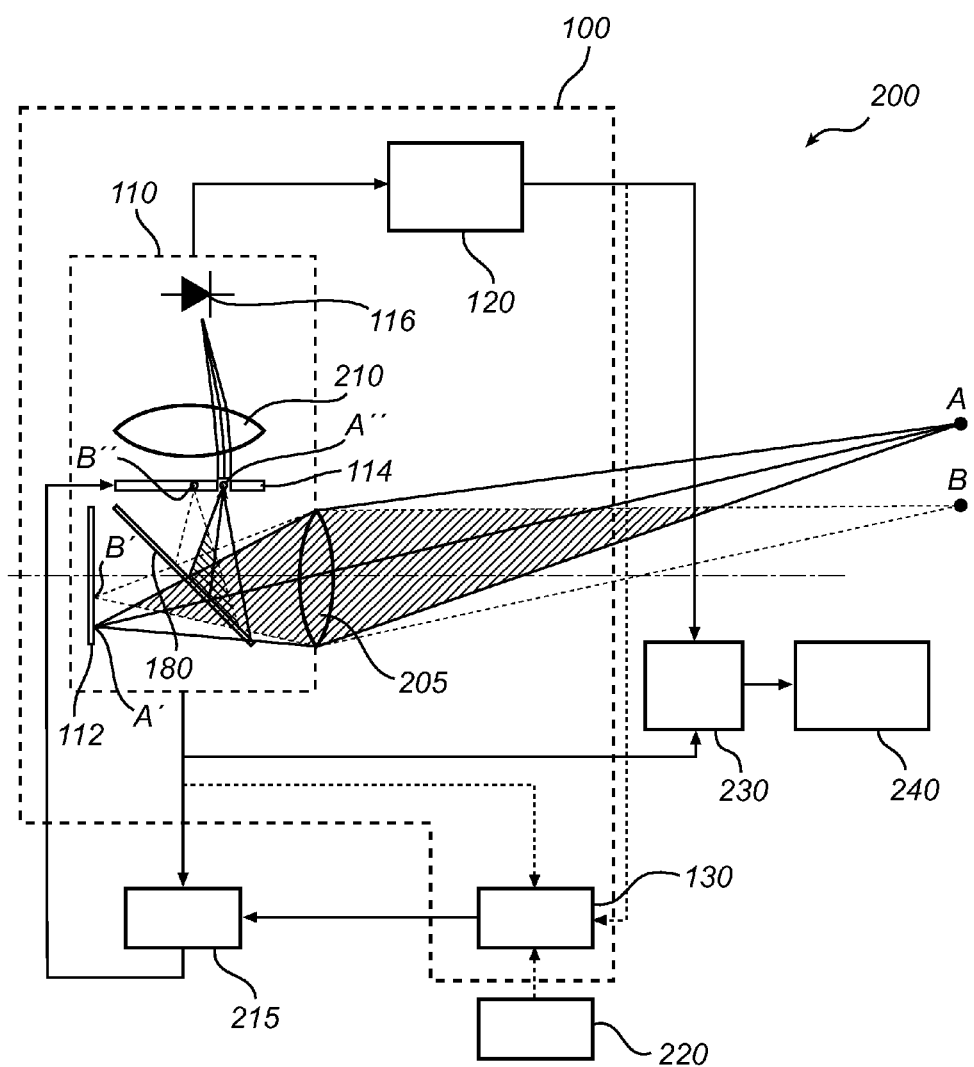
FIG. 2 is a schematic block diagram of a lighting system according to an exemplifying embodiment of the present invention.

Referring now to FIG. 2, there is shown a schematic block diagram of a lighting system 200 according to an exemplifying embodiment of the present invention.

The lighting system 200 comprises a sensing device 100. The sensing device 100 comprises a sensing module 110, a processing module 120 connectable to the sensing module 110 and a control module 130 connectable to the sensing module 110.

The control module 130 may connectable to the processing module 120.

The sensing device 100 is adapted to receive light emitted from a plurality of light sources, each of the plurality of light sources emitting light comprising a light source identifier. According to the embodiment depicted in FIG. 2 there are two such light sources A, B situated in the field of view of the sensing device 100. Each of the light sources A and B emits coded light. It is to be understood that the number of light sources may be substantially larger than two, for example ten, fifteen, twenty, thirty or fifty or more light sources.

The sensing module 110 comprises a first photo sensor unit 112, a light selection unit 114 and a second photo sensor unit 116.

The function and operation of the first photo sensor unit 112, light selection unit 114, second photo sensor unit 116 and processing module 120, respectively, is substantially the same or similar to the function and operation of the first photo sensor unit 112, light selection unit 114, second photo sensor unit 116 and processing module 120, respectively, described with reference to FIG. 1a.

With further reference to FIG. 2, the sensing module 200 comprises a semitransparent beam splitter 180.

As indicated in FIG. 2, the beam splitter 180 is configured to receive light emitted from the light sources A, B and convey a portion of the received light to the first photo sensor unit 112 and convey a portion of the received light to the light selection unit 114.

According to the embodiment of FIG. 2, the first photo sensor unit 112 comprises an image sensor. The image sensor may for example comprise or be constituted by a CCD based image sensor and/or a CMOS based image sensor, comprising a plurality of photo sensors, e.g., pixels.

The plurality of photo sensors of the first photo sensor unit 112 may hence be constituted by the plurality of pixels in the image sensor.

Imaging optics 205, for example an objective lens system, casts or projects the images of the light sources A, B on the image sensor comprised in the first photo sensor unit 112, the image sensor defining a primary imaging plane.

As indicated in FIG. 2, the images of light sources A, B appear as points A', B' in the primary imaging plane.

The semitransparent beam splitter 180 creates a secondary image plane where the light sources A and B appear as points A" and B", respectively.

Now, in accordance with a principle of the present invention, in order to detect light originating from the light source for decoding information encoded into the emitted light, the light from all other light sources in the field of view of the sensing device 100 is suppressed. According to the depicted example, this means that light emitted from light source B is suppressed. This is achieved by means of the arrangement of the light selection unit 114 in the secondary image plane such that the momentarily undesired light contributions, which in the case depicted in FIG. 2 are the contributions from light source B corresponding to point B" in the secondary image plane, are suppressed. This is achieved by the light selection unit 114 comprising a plurality of light selecting elements, each light selecting element being configured to controllably and selectively convey light impinging on the light selecting element to the second photo sensor unit 116. In FIG. 2 this is represented by the relatively small aperture in the light selection unit 114 at point A" in the secondary image plane.

Hence, the light selection unit 114 is adapted to selectively convey a selected portion of light received by the light selection unit 114 to the second photo sensor unit 116.

To this end, the light selection unit 114 is arranged relatively to the first photo sensor unit 112 in such a way that the selected portion of light at least momentarily is associated with a pixel of the image sensor comprised in the first photo sensor unit 112 detecting light. In FIG. 2, this pixel is situated in the first photo sensor unit 112 at point A' in the primary image plane.

Hence, the small aperture in the light selection unit 114 allows coded light originating from light source A to be conveyed or passed to the second photo sensor unit 116.

The second photo sensor unit 116 may for example comprise or be constituted by a photodiode, phototransistor, bolometer or another type of photoelectric converter.

Collimating optics 210 such as a lens or a lens system facilitates conveyance of light from a point in the secondary image plane to the second photo sensor unit 116.

The light selection unit 114 may be arranged such that the above-mentioned pixel of the image sensor comprised in the first photo sensor unit 112 is momentarily or temporarily 'locked' to the aperture in the light selection unit 114 at point A" in the secondary image plane. By establishing a temporary lock in this manner, the selective detection of coded light originating from light source A may become insensitive to rotations of the sensing device and/or the sensing module since the relation between coordinates of the aperture in the light selection unit 114 and the coordinates of the point A' in the primary image plane is fixed under the duration of the temporary lock.

With further reference to FIG. 2, as indicated by the line from the sensing module 110 to the element indicated by reference numeral 215, signals generated by the image sensor comprised in the first photo sensor unit 112 are transmitted to an image processing module 215 configured to generate an image representation for each image captured by the image sensor comprised in the photo sensor unit 112. The image representations may subsequently be digitally processed.

By means of the control module 130 connected to the image processing module 215, selection of a pixel detecting light of the plurality of pixels in the image sensor comprised in the first photo sensor 112 may be performed manually by a user, for example by providing user input to a user interface (UI) 220 of the control module 130, and/or automatically, for example by means of an algorithm implemented in the control module 130 for selecting all of the light sources visible in the field of view of the sensing device as indicted by the image sensor comprised in the first photo sensor unit, one at a time.

Generation of image representations of images captured by the image sensor comprised in the first photo sensor unit 112 may alternatively or optionally be carried out by the image sensor and/or first photo sensor unit itself. This situation is indicated in FIG. 2. Signals indicative of the image representations and/or other signals generated by the image sensor comprised in the first photo sensor unit 112 are transmitted to a combiner and/or multiplexer 230 configured to combine and/or multiplex two or more signals input to the combiner and/or multiplexer 230.

Each of the light sources A, B is emitting light comprising location, configuration and/or status information related to the respective light source A, B.

The processing module 120 is configured to extract information related to the identified light source from the signal generated by the second photo sensor unit 116.

Configuration and/or status information of a light source may for example comprise luminance and/or color of emitted light, operating power, operating temperature, operating temperature relatively to a threshold temperature, accumulated operating or burning hours, estimated lifetime remaining, etc., of the light source.

The information related to the identified light source or light sources in the image representation may be included in the image representations by means of the combiner and/or multiplexer 230, as indicated in FIG. 2 by the line connecting the processing module 120 with the combiner and/or multiplexer 230.

Hence, captured images of the field of view of the sensing device 100 may be augmented with light source related information for subsequent display to the user, e.g. by means of electronic visual display unit 240. The light source related information can be overlaid on captured images for providing the user with real-time information of light source related information on the electronic visual display unit 240.

In conclusion, there is disclosed a sensing device adapted to receive light emitted from a plurality of light sources, each of the plurality of light sources emitting light comprising a light source identifier. The sensing device comprises a sensing module comprising a light selection unit configured to receive at least a portion of the light emitted from the plurality of light sources and a light selection unit configured to receive at least a portion of the light emitted from the plurality of light sources. The light selection unit is adapted to selectively convey a selected portion of light received by the light selection unit to a second photo sensor unit. The light selection unit is arranged relatively to the first photo sensor unit, or vice versa, in such a way that the selected portion of light is associated with a photo sensor of a plurality of photo sensors of the first photo sensor unit detecting light.

While the invention has been illustrated and described in detail in the appended drawings and the foregoing description, such illustration and description are to be considered illustrative or exemplifying and not restrictive; the invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Any reference signs in the claims should not be construed as limiting the scope.

The invention claimed is:

1. A sensing device configured to receive light emitted from a plurality of light sources, at least some of the plurality of light sources emitting light comprising a light source identifier, the sensing device comprising:
    a sensing module comprising:
    a first photo sensor unit configured to receive at least a portion of the light emitted from the plurality of light sources, the first photo sensor unit comprising a plurality of photo sensors, at least some of the plurality of photo sensors being configured to detect light impinging on said photo sensor;
    a light selection unit configured to receive at least a portion of the light emitted from the plurality of light sources; and
    a second photo sensor unit configured to generate a signal corresponding to light impinging thereon;
    the light selection unit being configured to selectively convey a selected portion of light received by the light selection unit to the second photo sensor unit;
    the light selection unit being arranged relatively to the first photo sensor unit in such a way that the selected portion of light is associated with a photo sensor of the plurality of photo sensors of the first photo sensor unit detecting light; and
    a processing module connectable to the sensing module, the processing module being configured to determine a light source identifier of the selected portion of light for identifying a light source from which the selected portion of light originates on basis of a signal generated by the second photo sensor unit.

2. The sensing device according to claim 1, wherein the light selection unit is arranged relatively to the first photo sensor unit in such a way that the selected portion of light is associated with a photo sensor of the plurality of photo sensors of the first photo sensor unit detecting light, such that the selected portion of light corresponds to light impinging on said photo sensor of the plurality of photo sensors of the first photo sensor unit detecting light.

3. The sensing device according to claim 1, wherein the light selection unit is configured to selectively and controllably convey the selected portion of the light to the second photo sensor unit.

4. The sensing device according to claim 3, further comprising a control module (130) configured to select a photo sensor of the plurality of photo sensors of the first photo sensor unit detecting light, and, on basis of the arrangement of the light selection unit relatively to the first photo sensor unit, control the light selection unit to convey a selected portion of the light to the second photo sensor such that the selected portion of light is associated with the selected photo sensor of the plurality of photo sensors of the first photo sensor unit.

5. The sensing device according to claim 3, wherein the light selection unit comprises a plurality of light selecting elements (140a-140e), each light selecting element being configured to controllably and selectively convey light impinging on the light selecting element to the second photo sensor unit.

6. The sensing device according to claim 5, wherein the light selection unit is arranged relatively to the first photo sensor unit in such a way that there is a correspondence between the plurality of light selecting elements and the plurality of photo sensors of the first photo sensor unit.

7. The sensing device according to claim 5, wherein the plurality of light selecting elements comprise a plurality of liquid crystal display, LCD, elements controllable with regards to light attenuation, each of the plurality of LCD elements being configured to controllably and selectively convey light impinging on the LCD element to the second photo sensor unit.

8. The sensing device according to claim 3, wherein the light selection unit comprises a microelectro-mechanical system, MEMS, device being configured to controllably and selectively convey light impinging on the MEMS device to the second photo sensor unit.

9. The sensing device according to claim 8, wherein the MEMS device comprises a plurality of micromirrors, each micromirror being configured to controllably and selectively convey light impinging on the micromirror to the second photo sensor unit.

10. The sensing device according to claim 9, wherein the processing module is configured to determine a light source identifier of the selected portion of light for identifying a light source from which the selected portion of light originates on basis of a signal generated by the second photo sensor unit and a switching frequency of a micromirror, based on heterodyne detection.

11. The sensing device according to claim 5, wherein the light selection unit and the second photo sensor unit are constituted by an active pixel image sensor comprising a plurality of pixels and being configured to select a portion of the received light by selecting a least one pixel of the active pixel image sensor as active region and generate a signal corresponding to the selected portion of light, the active pixel image sensor being arranged relatively to the first photo sensor unit in such a way that the selected portion of light is associated with the photo sensor of the plurality of photo sensors of the first photo sensor unit detecting light.

12. The sensing device according to any one of claim 5, wherein the first photo sensor unit, the light selection unit and the second photo sensor unit are constituted by an active pixel image sensor comprising a plurality of pixels and being configured to select a portion of the received light by selecting a least one pixel of the active pixel image sensor that is detecting light as active region and generate a signal corresponding to the selected portion of light.

13. The sensing device according to claim 1, wherein the light selection unit comprises a light-transmissive portion configured to convey the selected portion of light to the second photo sensor unit.

14. The sensing device according to claim 13, wherein the light selection unit is arranged relatively to the first photo sensor unit in such a way that the light-transmissive portion is associated with at least one of the plurality of photo sensors of the first photo sensor unit.

15. The sensing device according to any one of claim 1, wherein each of the plurality of light sources is emitting light comprising location, configuration and/or status information related to the respective light source and the processing module is configured to extract information related to the identified light source from the signal generated by the second photo sensor unit.

16. The sensing device according to claim 15, wherein the first photo sensor unit comprises an image sensor configured to capture at least one image and produce an image representation of each captured image, the sensing device further comprising a combiner (230) connectable to the processing module and the sensing module, respectively, the combiner being configured to include the information related to the identified light source extracted by the processing module in the image representation.

17. The sensing device according to claim 16, wherein the image sensor is configured to capture a plurality of images and produce an image representation of each captured image, the sensing device further comprising an image processing module connectable to the combiner and the sensing module, respectively, the image processing module being configured to determine orientation and/or position of the sensing module with respect to the plurality of light sources on basis of the image representations corresponding to the captured images.

18. A sensing module included in a sensing device according to claim 1.

19. A lighting system comprising:
    a plurality of light sources, at least some of the plurality of light sources emitting light comprising a light source identifier; and
    a sensing device according to claim 1 configured to receive light emitted from the plurality of light sources.

* * * * *